Nov. 22, 1927.  
L. JOCHUM  
1,650,450  
COMPRESSED AIR MOTOR FOR BICYCLES  
Filed Aug. 19, 1926
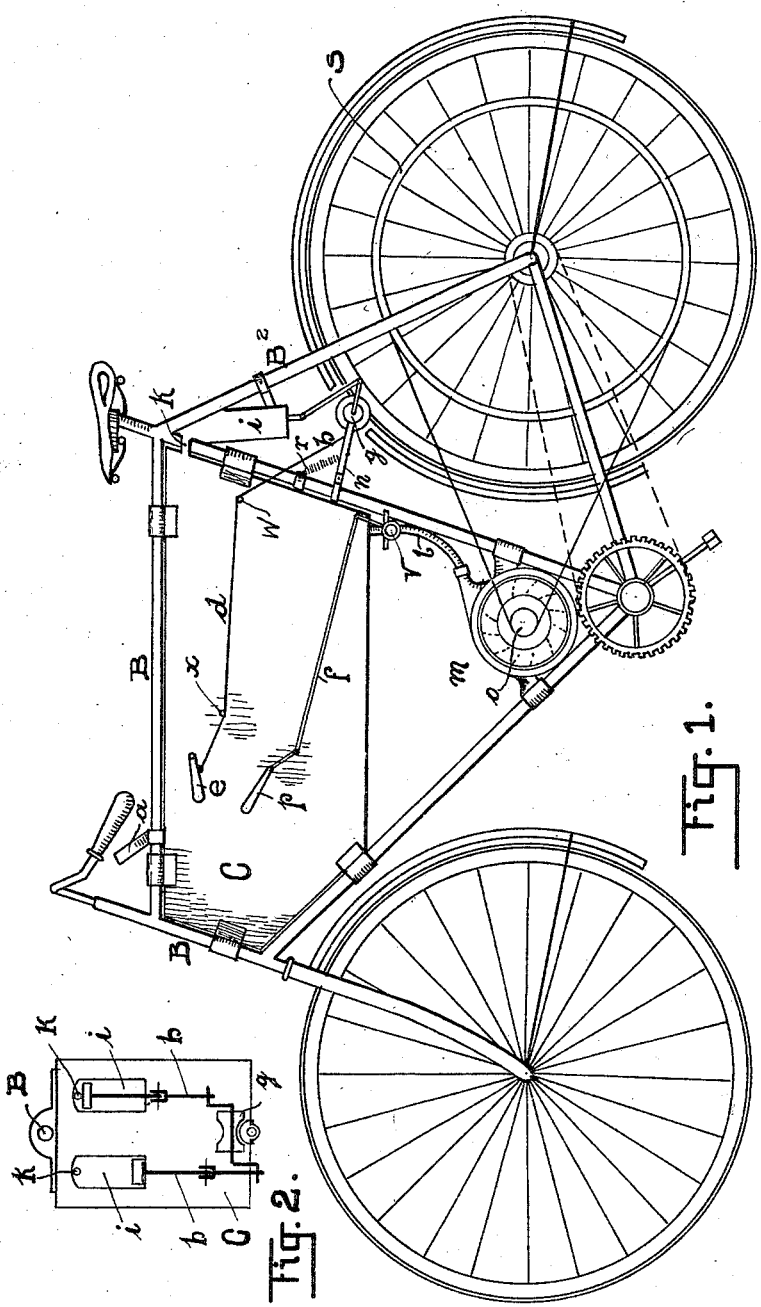
L. Jochum  
inventor
By: Marks & Clerk Patented Nov. 22, 1927.

1,650,450

UNITED STATES PATENT OFFICE.

LUIS JOCHUM, OF BUENOS AIRES, ARGENTINA.

COMPRESSED-AIR MOTOR FOR BICYCLES.

Application filed August 19, 1926. Serial No. 130,315.

This invention relates to the application, to an ordinary bicycle, of a device whereby the momentum of the bicycle on down-grades is utilized to store up compressed air, and an air motor to make available such stored up force to aid on up-grades.

The application of the so-called "free wheel" to bicycles has undoubtedly accomplished a great advantage by economizing the force applied to the propulsion of the vehicle, since after certain speed is reached the vehicle may continue to move for a considerable distance without pedalling. The motorcycle also constitutes the most perfect application of the explosion engine, but it presents certain disadvantages of which I will mention only a few of the most important, such as the relatively high price, and the frequency of difficulties in starting the motor.

This invention has for its object to provide bicycles with a compressed air engine which may be utilized to facilitate propulsion on up-grades by means of energy in the form of compressed air which is stored up without the application of extra force, and almost automatically.

For the better understanding of the invention a form of construction embodying it is illustrated in the accompanying drawing, in which:

Figure 1 represents a bicycle provided with the combination of apparatus constituting the invention; and Figure 2 is a detail of the double air pump.

As seen in the drawings, the entire space comprised within the rods B, B', B'' of the bicycle frame, or a great portion of that space, is occupied by a compressed air receiver C. This receiver is provided, at its upper rear part, with two tubes $k$ which connect it with the double air pump $i$, the plunger rods of which are provided with pitmen $h$, connecting with the crank shafts of a grooved wheel $g$, held in contact with the periphery of the driving wheel of the bicycle by means of the arm $n$ pivoted to a rigid part of the frame, and the spring $r$. To the arm $n$ there is attached a cable $d$ which, passing over the pulley $w$ and under the pulley $x$, is attached to the controller lever $e$ pivoted to the side of the receiver C.

From the rear lower side of the receiver C the tube $l$ extends, being provided with a two-way valve $v$ controlled by the lever $p$ through the set of rods $f$. The tube $l$ conducts the air from the receiver C to the air motor or turbine $m$ attached to the lower part of the bicycle frame, said turbine being provided with a pulley $o$ from which the power is transmitted by a belt to a band wheel $s$ attached to the side of the driving wheel.

The operation is as follows: The bicycle being in motion, it being desired to store up compressed air, the cyclist loosens the lever $e$ whereby the pulley $g$ is placed in engagement with the rim or tire of the driving wheel, and said pulley $g$ receives the power and transmits it to the air pump $i$ through the pitman $h$. The air is injected by the pump into the receiver C, the tubes $k$ being provided with ordinary internal check valves.

A pressure is soon produced in the receiver C, being indicated by the pressure gauge $a$. When the pressure marked as "maximum" is reached the action of the pumps may be suspended by the cyclist by a reverse movement of the lever $e$ which retires the pulley $g$ from active contact with the driving wheel.

When the cyclist desires to ease the power necessary for hill climbing, or to rest while travelling on a level, he opens by means of the lever $p$ the air valve $v$, and as the pressure is introduced into the air motor $m$, the latter starts and its movement is transmitted to the band wheel $s$ as heretofore described, so that the bicycle runs without effort of the rider.

Of course, the cyclist will take advantage of the down-grades to charge the air compression receiver C, and may then allow his legs to rest in the free wheel position on the up-grades, the free wheel being also used for braking purposes in the well known manner.

It is evident that although the invention has been described and illustrated as applied to a bicycle, it is equally applicable to a tricycle or any vehicle propelled by pedals.

Having thus described my invention, what I claim and desire to protect by Letters Patent, is:

1. In a bicycle, an air pump propelled by a wheel of the bicycle, an air pressure receiver to receive the compressed air from said pump, and an air motor adapted to be propelled by the air pressure from said receiver and to transmit its movement to the driving wheel of the bicycle, substantially as described.

2. The combination of apparatus described in claim 1, further characterized in that the air pump is operated by means of a pulley propelled by the rim of a wheel of the bicycle, said pulley being provided with a crank shaft and pitman whereby the force is transmitted to the plungers of the air pump, and means to place the said pulley in or out of operative contact with the rim of said wheel, substantially as described.

3. The combination of apparatus described in claim 1, further characterized in that the compressed air receiver is placed within the space comprised betwen the rods of the bicycle frame, substantially as described.

4. In a bicycle, the combination of an air pressure receiver placed within the space comprised between the rods of the bicycle frame, said air pressure receiver receiving compressed air from an air pump moved by a pitman and pulley connection with the rim of the driving wheel of the bicycle, means for placing said air pump in or out of action, consisting of a cable attached to an arm carrying the said pulley, said cable running over and under two guiding pulleys mounted on the side of the pressure receiver, an air motor, means under control of the cyclist to admit pressure to said motor or shut off the same at will, a pulley on the shaft of said motor, and a band running from said pulley to a band wheel attached to the driving wheel of the bicycle, substantially as described.

Signed at Buenos Aires, Argentina this 23rd day of July, A. D. 1926.

LUIS JOCHUM.